United States Patent
Holliday et al.

(10) Patent No.: US 10,439,534 B2
(45) Date of Patent: Oct. 8, 2019

(54) SYSTEM AND METHOD FOR CONTROLLING SWITCHING DEVICE TEMPERATURE OF ELECTRICAL POWER SYSTEMS

(71) Applicant: General Electric Company, Schenectady, NY (US)

(72) Inventors: Cornelius Edward Holliday, Forest, VA (US); Robert Gregory Wagoner, Roanoke, VA (US); David Smith, Daleville, VA (US)

(73) Assignee: General Electric Company, Schenectady, NY (US)

(*) Notice: Subject to any disclaimer, the term of this patent is extended or adjusted under 35 U.S.C. 154(b) by 89 days.

(21) Appl. No.: 15/857,881

(22) Filed: Dec. 29, 2017

(65) Prior Publication Data

US 2019/0207541 A1 Jul. 4, 2019

(51) Int. Cl.
*H02P 9/00* (2006.01)
*H02K 7/18* (2006.01)

(52) U.S. Cl.
CPC ............ *H02P 9/007* (2013.01); *H02K 7/183* (2013.01); *H02P 9/006* (2013.01)

(58) Field of Classification Search
CPC .......... H02K 7/183; H02P 9/006; H02P 9/007
USPC ..................................................... 290/44, 55
See application file for complete search history.

(56) References Cited

U.S. PATENT DOCUMENTS

| | | | |
|---|---|---|---|
| 8,432,052 B2* | 4/2013 | Lu | H02P 9/105 290/44 |
| 9,030,174 B2* | 5/2015 | Wagoner | H02M 7/53871 290/44 |
| 2008/0315814 A1* | 12/2008 | Takizawa | B60L 15/00 318/434 |
| 2010/0143116 A1* | 6/2010 | Zang | F03D 7/0264 416/1 |
| 2011/0286244 A1 | 11/2011 | Wei et al. | |
| 2011/0295437 A1* | 12/2011 | Lu | H02P 9/105 700/287 |
| 2011/0309875 A1 | 12/2011 | Wei et al. | |
| 2013/0241463 A1* | 9/2013 | Bando | H02P 9/007 318/810 |
| 2014/0042745 A1* | 2/2014 | Perley | F03D 7/0272 290/44 |
| 2014/0204630 A1* | 7/2014 | Wagoner | H02M 5/4585 363/37 |
| 2015/0311696 A1* | 10/2015 | Zhu | H02H 7/06 361/21 |
| 2017/0264284 A1* | 9/2017 | Xu | H02M 1/088 |
| 2017/0349059 A1* | 12/2017 | Xu | H02P 27/08 |

\* cited by examiner

*Primary Examiner* — Charles Reid, Jr.
(74) *Attorney, Agent, or Firm* — Dority & Manning, P.A.

(57) ABSTRACT

A method for controlling temperature of a switching device of a power converter of an electrical power system includes monitoring, via one or more sensors, at least one operating condition of the electrical power system. Further, the method includes monitoring a temperature of the switching device. Moreover, the method includes controlling, via a control system communicatively coupled to the one or more sensors, torque of a generator of the electrical power system based on the at least one operating condition of the electrical power system so as maintain the temperature of the switching device below a predetermined threshold.

15 Claims, 5 Drawing Sheets

SYSTEM AND METHOD FOR CONTROLLING SWITCHING DEVICE TEMPERATURE OF ELECTRICAL POWER SYSTEMS

FIELD

The present disclosure relates generally to electrical power systems, and more particular to a system and method for limiting temperature of switching devices of electrical power systems using torque control.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology. In such system, the generator stator is separately connected to the power grid via a main transformer.

The power converter usually includes several switching devices such as insulated gate bipolar transistors (IGBTs), integrated gate commutated thyristors (IGCTs or GCTs), diodes, or metal oxide semiconductor field effect transistors (MOSFETs) that are switched at certain frequencies to generate the desired converter output voltage and frequency. The converter output voltage is then provided to various loads such as motors, power grids, resistive loads, etc.

Some grid and/or wind conditions, when combined with high ambient temperatures, can cause the switching devices junction temperatures to reach their design limit, which forces a trip in the converter control to occur in order to protect the switching devices. Such tripping, however, can cause a sudden drop in torque applied via the generator to the main shaft of the wind turbine, thereby leading to an over-speed condition if pitch and braking strategies are not applied. This in turn forces pitch and braking mechanisms to act to prevent the over-speed condition. Each application of the braking mechanisms must be accounted for in either the robustness of the design or in the frequency of the maintenance inspections and replacements.

Thus, the present disclosure is directed to systems and methods for limiting temperature of the switching devices using torque control that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for controlling temperature of a switching device of an electrical power system. The electrical power system has a generator and a power converter containing the switching device. The method includes monitoring, via one or more sensors, at least one operating condition of the electrical power system. Further, the method includes monitoring a temperature of the switching device. Moreover, the method includes controlling, via a control system communicatively coupled to the one or more sensors, torque of generator of the electrical power system based on the operating condition(s) of the electrical power system so as maintain the temperature of the at least one switching device below a predetermined threshold.

In one embodiment, the operating condition(s) of the electrical power system may include any one of or combination of the following: coolant temperature, baseplate temperature, modeled switching device temperature, DC link voltage, DC link current, bridge currents, system current feedbacks, system voltage feedbacks, generator speed, wind speed, wind turbulence, or grid frequency.

In another embodiment, the switching device(s) may include an insulated gate bipolar transistor, a diode, a metal-oxide semiconductor field-effect transistor, or any other suitable switching device.

In certain embodiments, the step of controlling torque of the electrical power system based on the operating condition(s) of the electrical power system may include increasing the torque in response to certain grid and wind conditions to prevent an increase in generator speed of the electrical power system from causing an increase in the temperature of the switching device. In additional embodiments, the step of controlling torque of the electrical power system based on the operating condition(s) of the electrical power system may include decreasing the torque to lower currents in bridge circuits of the electrical power system so as to lower the temperature of the switching device.

For example, in one embodiment, the step of controlling torque of the electrical power system based on the operating condition(s) of the electrical power system may include decreasing the torque in response to the coolant temperature, the baseplate temperature, and the modeled switching temperature exceeding a predetermined temperature threshold.

In several embodiments, the electrical power system may be a wind turbine power system or an energy storage system.

In another aspect, the present disclosure is directed to a doubly fed induction generator (DFIG) power system connected to a power grid. The DFIG power system includes a DFIG having a rotor and a stator, a power converter having a rotor-side converter coupled to a line-side converter via a DC link and at least one switching device, one or more sensors for monitoring at least one operating condition of the DFIG power system and a temperature of the switching device(s), and a control system communicatively coupled to the one or more sensors. Further, the control system is configured to control torque of the DFIG of the DFIG power system based on the operating condition(s) of the DFIG power system so as maintain the temperature of the at least one switching device below a predetermined threshold. It should also be understood that the DFIG power system may further include any of the additional steps and/or features as described herein.

In yet another aspect, the present disclosure is directed to a method for controlling temperature of a switching device of an electrical power system. The electrical power system has a generator and a power converter containing the switching device. The method includes monitoring, via one or more sensors, at least one operating condition of the electrical power system and a temperature of the switching device. Further, the method includes controlling, via a control system communicatively coupled to the one or more sensors, current of one or more bridge circuits of the power converter of the electrical power system based on the at least one operating condition of the electrical power system so as maintain the temperature of the at least one switching device below a predetermined threshold. It should also be understood that the method may further include any of the additional steps and/or features as described herein.

Further, in one embodiment, the step of controlling current of one or more bridge circuits of the electrical power system based on the operating condition(s) of the electrical power system may include increasing the current of one or more bridge circuits in response to certain grid and wind conditions to prevent an increase in generator speed of the electrical power system from causing an increase in the temperature of the at least one switching device. In addition, the step of controlling current of one or more bridge circuits of the electrical power system based on the operating condition(s) of the electrical power system may include decreasing the current of one or more bridge circuits to lower currents in bridge circuits of the electrical power system so as to lower the temperature of the at least one switching device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for limiting temperature of the switching devices of electrical power systems, such as DFIG power systems, using torque control. More specifically, the present disclosure provides a system for controlling torque in response to various operating conditions, such as coolant temperatures, baseplate temperatures, switching device temperatures, DC link voltage, DC link current, bridge currents, system current feedbacks, system voltage feedbacks, generator speed, wind speed, wind turbulence, and/or grid frequency for the purpose of reducing the peak and sustained switching device temperatures in order to avoid a trip, device damage, or to improve lifetime. For example, the torque can be increased under certain conditions to prevent an imminent increase in speed from causing elevated switching device temperatures. In other instances, the torque can be decreased to lower the currents in the bridge for the purpose of lowering the switching device temperatures.

In particular embodiments, the method may include reducing the torque in direct response to the combination of coolant temperature, baseplate temperature, and modeled switching device die temperatures to avoid adversely high die temperatures that would trigger system trips and limit device lifetimes. Further, the system and method may be applied to any electrical power systems, including but not limiting to wind conversion systems, solar conversions systems, energy storage systems, and combinations thereof. In solar conversion systems, bridge current can be controlled instead of torque as there is not a rotating machine component of the system.

Accordingly, the present disclosure has many advantages not present in the prior art. For example, the system and method of the present disclosure provides a higher system reliability (e.g. fewer trips, less device damage, etc.) as well as lower system cost (e.g. lower design margin in the switching devices, lower design margin in the braking systems, and/or lower maintenance costs).

Figure 1:
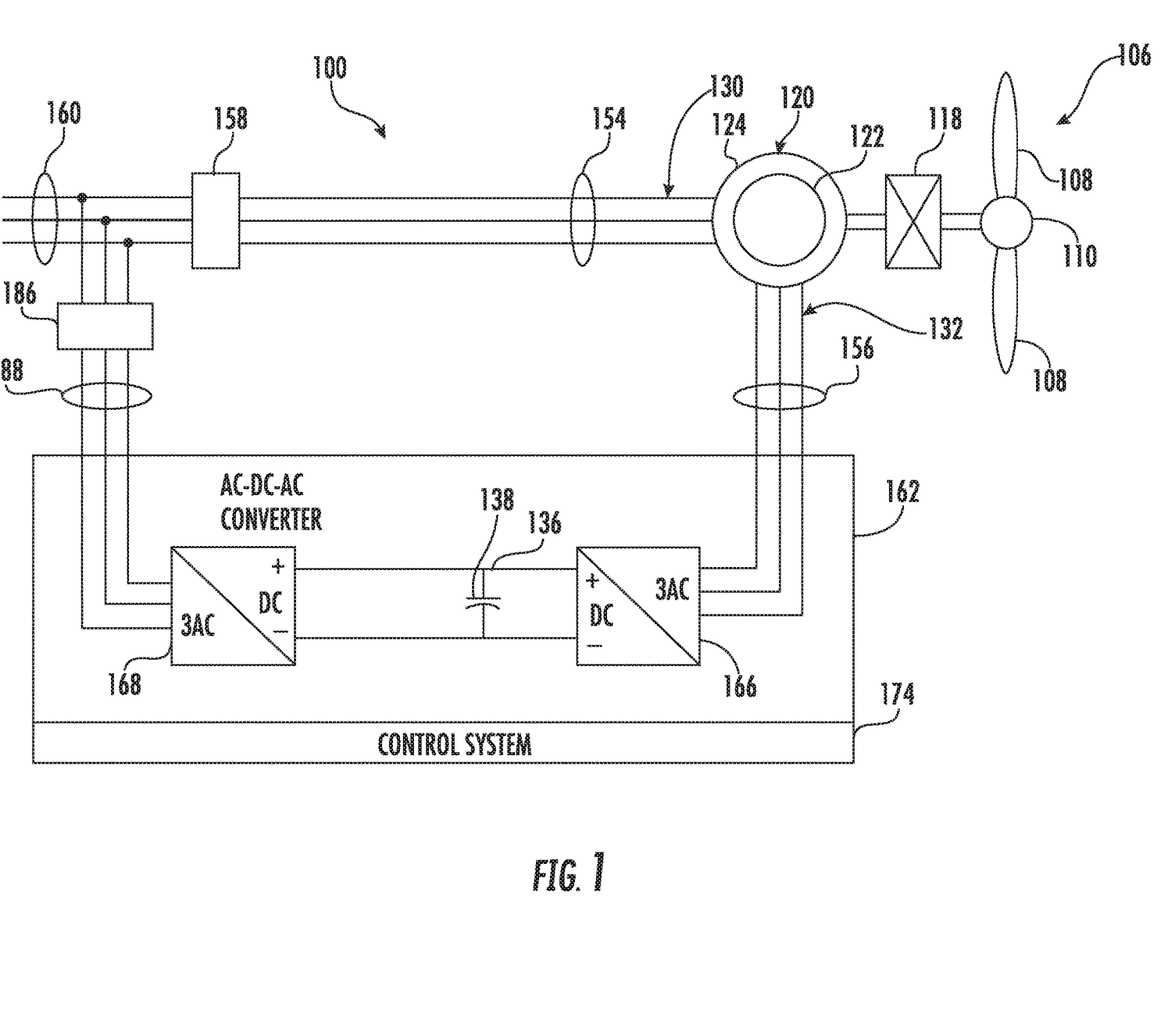
FIG. 1 illustrates one embodiment of an example renewable energy power system according to the present disclosure.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 10 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gearbox 118, which is, in turn, coupled to a generator 120 having a rotor 122 and a stator 124. In accordance with aspects of the present disclosure, the generator 120 may be any suitable generator, including for example, a doubly fed induction generator (DFIG). The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

The power converter 162 includes a rotor-side converter 166 coupled to a line-side converter 168. The DFIG 120 is coupled to the rotor-side converter 166 via the rotor bus 156. The line-side converter 168 is coupled to a line-side bus 188. Further, as shown, the stator bus 154 may be directly connected to the line-side bus 188. In example configurations, the rotor-side converter 166 and the line-side converter 168 are configured for normal operating mode in a three-phase, PWM arrangement using insulated gate bipolar transistor (IGBT) switching devices, which are discussed in more detail herein. The rotor-side converter 166 and the line-side converter 168 can be coupled via a DC link 136 across which is the DC link capacitor 138. In alternative embodiments, the stator bus 154 and the power converter 162 may be connected to separate isolated windings of a transformer (not shown), i.e. at the junction of the generator breaker 158 and the converter breaker 186.

Figure 2:
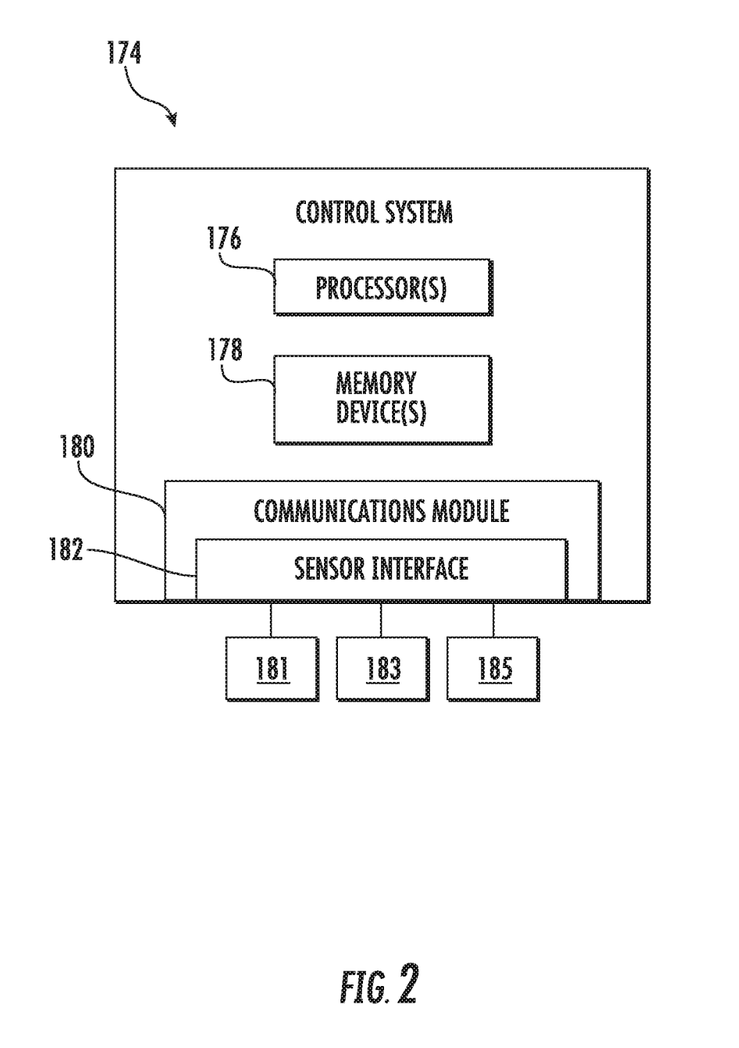
FIG. 2 illustrates a block diagram of one embodiment of a control system suitable for use with the renewable energy power system shown in FIG. 1.

The power converter 162 can be coupled to a control system 174 to control the operation of the rotor-side converter 166 and the line-side converter 168 and other aspects of the power system 100. For example, as shown particularly in FIG. 2, the control system 174 can include any number of control devices. In one implementation, for example, the control system 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching devices of the power converter 162 and other aspects of the power system 100. Additionally, the control system 174 may also include a communications module 180 to facilitate communications between the control system 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown in FIG. 2, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the control system 174 to perform the various functions as described herein.

In operation, alternating current power generated at the DFIG 120 by rotation of the rotor 106 is provided via a dual path to an electrical grid 160. The dual paths are defined by a generator power path 130 and a converter power path 132. On the converter power path 132, sinusoidal multi-phase (e.g. three-phase) alternating current (AC) power is provided to the power converter 162 via the rotor bus 156.

The rotor-side power converter 166 converts the AC power provided from the rotor bus 156 into direct current (DC) power and provides the DC power to the DC link 136. Switching devices (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching devices (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz).

Various circuit breakers and switches, such as a generator breaker 158 and converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control system 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 3:
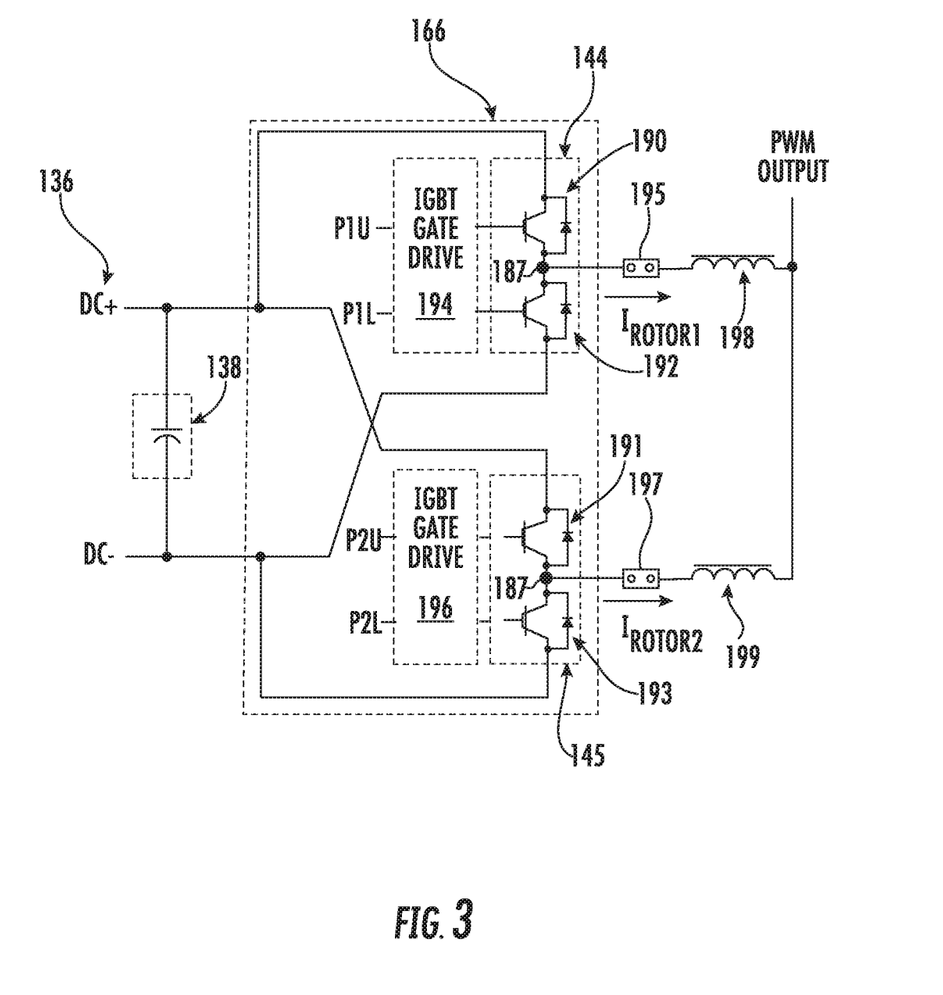
FIG. 3 illustrates a schematic diagram of one embodiment of the various components of a rotor-side converter according to the present disclosure, particularly illustrating one of the three phases.

Referring now to FIG. 3, a partial schematic diagram of the rotor-side power converter 166 is illustrated. More specifically, as shown, the rotor-side converter 166 may include two power bridge circuits 144, 145 connected in parallel. Though it should be understood that the rotor-side converter 166 may include any number of power bridge circuits connected in parallel, including more than two. Further, as shown, each of the power bridge circuits 144, 145 may include one or more switching devices (i.e. 190, 192 and 191, 193, respectively) coupled in series with one another. It should be understood by those of ordinary skill in the art that the switching devices 190, 191, 192, 193 can be any suitable switching device, such as an IGBT (i.e. an insulated-gate bipolar transistor), power MOSFET (i.e. a metal-oxide semiconductor field-effect transistor), or other suitable switching device. For instance, as shown, the switching devices 190, 191, 192, 193 may correspond to IGBTs having a gate, a collector, and an emitter. In addition, as shown, the illustrated IGBTs 190, 191, 192, 193 can be coupled to an antiparallel diode. Moreover, as shown, the power converter 162 may include an IGBT gate drive 194, 196 for each of the power bridge circuits 144, 145.

The switching devices 190, 191, 192, 193 can be controlled, for instance, by the control system 174 (FIGS. 1 and 2). Thus, pulse frequency modulation commands (e.g. gate drive commands) can be provided to one or more of the switching devices 190, 191, 192, 193 via the IGBT gate drives 194, 196. Each of the power bridge circuits 144, 145 may also be coupled to a rotor shunt 195, 197 which is coupled to a respective rotor reactor 198, 199.

Some grid and/or wind conditions, when combined with high ambient temperatures, can cause the bridge switching devices (e.g. IGBTs 190, 191, 192, 193) junction temperatures to reach a limit placed on the device. This will force a trip in the converter control to occur in order to protect the switching devices 190, 191, 192, 193. A trip of the power converter 162 causes a sudden drop in torque applied via the generator 120 to the main shaft of the wind turbine power system 100. This will lead to an over-speed condition if pitch and braking strategies are not applied; therefore, this in turn forces pitch and braking mechanisms to act to prevent the over-speed condition. Each application of the braking mechanisms must be accounted for the in either the robustness of the design or in the frequency of the maintenance inspections and replacements. As such, the present disclosure is directed to a system and method for controlling temperature of the switching devices 190, 191, 192, 193 of the electrical power system 100 so as to prevent such trips.

Figure 4:
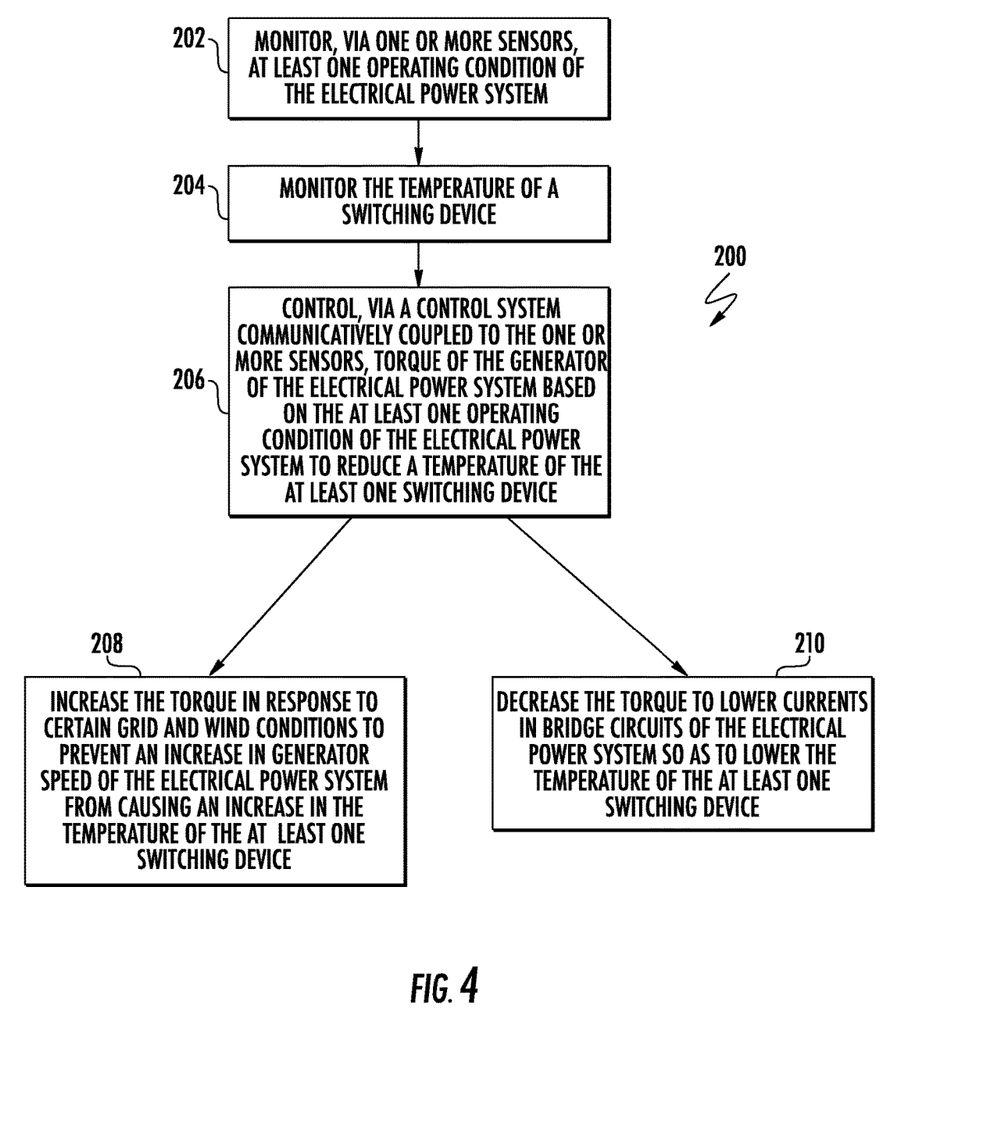
FIG. 4 illustrates a flow diagram of one embodiment of a method for controlling temperature of a switching device of an electrical power system according to the present disclosure.

Referring particularly to FIG. 4, a flow diagram of one embodiment of a method 200 for controlling temperature of the switching devices 190, 191, 192, 193 of the electrical power system 100 according to the present disclosure is illustrated. Further, FIG. 4 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at 202, the method 200 includes monitoring, via one or more sensors 181, 183, 185, at least one operating condition of the electrical power system 100. For example, in one embodiment, the operating condition(s) of the electrical power system 100 may include any one of or combination of the following: coolant temperature, baseplate temperature, modeled switching device temperature, DC link voltage, DC link current, bridge currents of the power bridge circuits 144, 145, system current feedbacks, system voltage feedbacks, generator speed of the generator 120, wind speed, wind turbulence, or grid frequency. As shown at 204, the method 200 may also include monitoring the temperature of the switching devices 190, 191, 192, 193.

Thus, as shown at 206, the method 200 also includes controlling torque of the electrical power system 100 based on the operating condition(s) of the electrical power system 100 so as maintain the temperature of the switching devices 190, 191, 192, 193 below a predetermined threshold (i.e. to reduce a peak or sustained temperature of the switching devices 190, 191, 192, 193). For example, as shown at 208, the control device 174 may increase the torque of the electrical power system 100 in response to certain grid and wind conditions to prevent an increase in generator speed from causing an increase in temperature of one or more of the switching devices 190, 191, 192, 193. In addition, as shown at 210, the control device 174 may decrease the torque of the electrical power system 100 to lower currents in the power bridge circuits 144, 145 so as to lower the temperature in one or more of the switching devices 190, 191, 192, 193. More specifically, in one example, the control device 174 may directly reduce the torque in response to the combination of the coolant temperature, the baseplate temperature, and the modeled switching temperature exceeding a predetermined temperature threshold.

Figure 5:
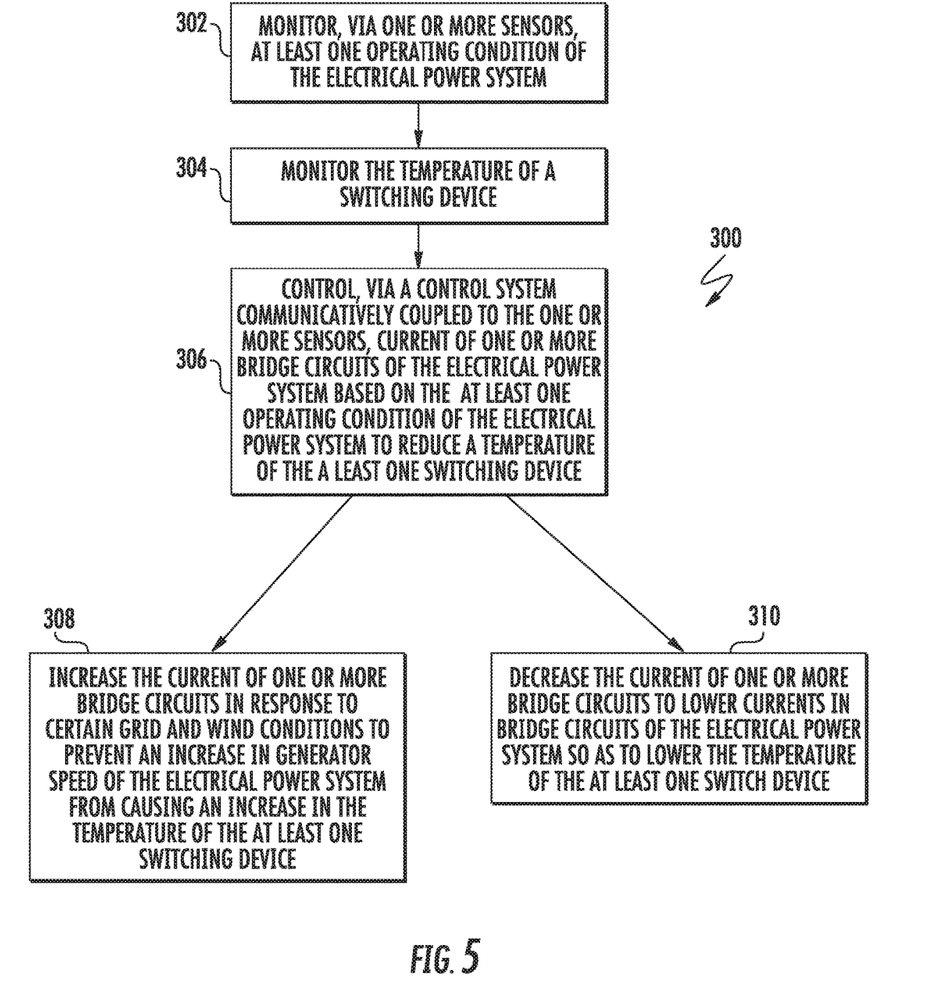
FIG. 5 illustrates a flow diagram of another embodiment of a method for controlling temperature of a switching device of an electrical power system according to the present disclosure.

Referring now to FIG. 5, a flow diagram of another embodiment of a method 300 for controlling temperature of one or more switching devices of an electrical power system according to the present disclosure is illustrated. For example, the illustrated method 300 may be applied to a solar conversion system. As shown at 302, the method 300 includes monitoring at least one operating condition of the electrical power system via one or more sensors. For example, as mentioned, the operating condition(s) may include any one of or combination of the following: coolant temperature, baseplate temperature, modeled switching device temperature, DC link voltage, DC link current, bridge currents of the power bridge circuits 144, 145, system current feedbacks, system voltage feedbacks, generator speed of the generator 120, wind speed, wind turbulence, or grid frequency. As shown at 304, the method 200 may also include monitoring the temperature of the switching devices 190, 191, 192, 193. Further, as shown at 306, the method 300 includes controlling current of one or more power bridge circuits of the electrical power system based on the operating condition(s) so as maintain the temperature of the switching devices below a predetermined threshold, e.g. by reducing the temperature of the switching devices.

More specifically, as shown at 308, the step of controlling current of one or more bridge circuits of the electrical power system based on the operating condition(s) of the electrical power system may include increasing the current of one or more bridge circuits in response to certain grid and wind conditions to prevent an increase in generator speed of the electrical power system from causing an increase in the temperature of the switching devices. In addition, as shown at 310, the step of controlling current of one or more bridge circuits of the electrical power system based on the operating condition(s) may include decreasing the current of one or more bridge circuits to lower currents in bridge circuits of the electrical power system so as to lower the temperature of the switching devices.

Exemplary embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications, such as solar power systems and energy storage systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling temperature of a switching device of an electrical power system, the electrical power system having a generator and a power converter containing the switching device, the method comprising:
   monitoring, via one or more sensors, at least one operating condition of the electrical power system;
   monitoring a temperature of the switching device; and,
   controlling, via a control system communicatively coupled to the one or more sensors, torque of the generator of the electrical power system based on the at least one operating condition of the electrical power system so as to maintain the temperature of the switching device below a predetermined threshold; and, wherein the at least one operating condition of the electrical power system comprises at least one of coolant temperature, baseplate temperature, modeled switching device temperature, DC link voltage, DC link current, bridge currents, system current feedbacks, system voltage feedbacks, generator speed, wind speed, wind turbulence, or grid frequency; and, wherein controlling torque of the electrical power system based on the at least one operating condition of the electrical power system further comprises decreasing the torque in response to the coolant temperature, the baseplate temperature, and the modeled switching temperature exceeding a predetermined temperature threshold.

2. The method of claim 1, wherein the switching device comprises at least one of an insulated gate bipolar transistor, a diode, or a metal-oxide semiconductor field-effect transistor.

3. The method of claim 1, wherein controlling torque of the electrical power system based on the at least one operating condition of the electrical power system further comprises increasing the torque in response to certain grid and wind conditions to prevent an increase in generator speed of the electrical power system from causing an increase in the temperature of the switching device.

4. The method of claim 1, wherein controlling torque of the electrical power system based on the at least one operating condition of the electrical power system further comprises decreasing the torque to lower currents in bridge circuits of the electrical power system so as to lower the temperature of the switching device.

5. The method of claim 1, wherein the electrical power system comprises at least one of a wind turbine power system or an energy storage system.

6. A doubly fed induction generator (DFIG) power system connected to a power grid, the DFIG power system comprising:
   a DFIG comprising a rotor and a stator;
   a power converter comprising a rotor-side converter coupled to a line-side converter via a DC link, the power converter comprising at least one switching device;
   one or more sensors for monitoring at least one operating condition of the DFIG power system and a temperature of the at least one switching device; and,
   a control system communicatively coupled to the one or more sensors, the control system configured to control torque of the DFIG of the DFIG power system based on the at least one operating condition of the DFIG power system so as to maintain the temperature of the at least one switching device below a predetermined threshold; and, wherein the at least one operating condition of the electrical power system comprises at least one of coolant temperature, baseplate temperature, modeled switching device temperature, DC link voltage, DC link current, bridge currents, system current feedbacks, system voltage feedbacks, generator speed, wind speed, wind turbulence, or grid frequency; and, wherein controlling torque of the electrical power system based on the at least one operating condition further comprises decreasing the torque in response to the coolant temperature, the baseplate temperature, and the modeled switching temperature exceeding a predetermined temperature threshold.

7. The DFIG power system of claim 6, wherein the at least one switching device comprises at least one of an insulated gate bipolar transistor, a diode, or a metal-oxide semiconductor field-effect transistor.

8. The DFIG power system of claim 6, wherein controlling torque of the DFIG power system based on the at least one operating condition of the DFIG power system further comprises increasing the torque in response to certain grid and wind conditions to prevent an increase in generator speed of the DFIG power system from causing an increase in the temperature of the at least one switching device.

9. The DFIG power system of claim 6, wherein controlling torque of the DFIG power system based on the at least one operating condition of the DFIG power system further comprises decreasing the torque to lower currents in bridge circuits of the DFIG power system so as to lower the temperature of the at least one switching device.

10. The DFIG power system of claim 6, wherein the DFIG power system comprises a wind turbine power system.

11. A method for controlling temperature of a switching device of an electrical power system, the electrical power system having a generator and a power converter containing the switching device, the method comprising:

monitoring, via one or more sensors, at least one operating condition of the electrical power system;

monitoring a temperature of the switching device; and, controlling, via a control system communicatively coupled to the one or more sensors, current of one or more bridge circuits of the power converter of the electrical power system based on the at least one operating condition of the electrical power system so as to maintain the temperature of the at least one switching device below a predetermined threshold; and, wherein controlling current of the one or more bridge circuits of the electrical power system based on the at least one operating condition of the electrical power system further comprises decreasing the current of the one or more bridge circuits to lower currents in bridge circuits of the electrical power system so as to lower the temperature of the switching device.

12. The method of claim 11, wherein the at least one operating condition of the electrical power system comprises at least one of coolant temperature, baseplate temperature, modeled switching device temperature, DC link voltage, DC link current, bridge currents, system current feedbacks, system voltage feedbacks, generator speed, wind speed, wind turbulence, or grid frequency.

13. The method of claim 11, wherein the switching device comprises at least one of an insulated gate bipolar transistor, a diode, or a metal-oxide semiconductor field-effect transistor.

14. The method of claim 11, wherein controlling current of the one or more bridge circuits of the electrical power system based on the at least one operating condition of the electrical power system further comprises increasing the current of the one or more bridge circuits in response to certain grid and wind conditions to prevent an increase in generator speed of the electrical power system from causing an increase in the temperature of the switching device.

15. The method of claim 11, wherein the electrical power system comprises at least one of a wind turbine power system, a solar power system, or an energy storage system.

* * * * *